(12) United States Patent
Kim et al.

(10) Patent No.: US 6,674,913 B1
(45) Date of Patent: Jan. 6, 2004

(54) METHOD AND APPARATUS FOR OBTAINING A HIGH RESOLUTION IMAGE

(75) Inventors: Yong-Hoon Kim, Kwangju (KR); Kang Gum-Sil, Kwangju (KR)

(73) Assignee: Kwangju Institute of Science and Technology, Kwangju (KR)

(*) Notice: Subject to any disclaimer, the term of this patent is extended or adjusted under 35 U.S.C. 154(b) by 615 days.

(21) Appl. No.: 09/693,217

(22) Filed: Oct. 20, 2000

(30) Foreign Application Priority Data

Mar. 23, 2000 (KR) .................................... 2000-14724

(51) Int. Cl.[7] .......................... G06K 9/40; G06K 9/36
(52) U.S. Cl. .................. 382/254; 382/255; 382/280
(58) Field of Search .............................. 382/154, 254, 382/255, 264, 276, 280, 296; 356/601, 603, 604, 606; 345/611, 659, FOR 156; 399/130, 181, 182; 359/32, 292

(56) References Cited

U.S. PATENT DOCUMENTS

| | | | | |
|---|---|---|---|---|
| 5,274,714 A | * | 12/1993 | Hutcheson et al. | 382/157 |
| 5,375,156 A | * | 12/1994 | Kuo-Petravic et al. | 378/9 |
| 5,412,592 A | * | 5/1995 | Krishnamoorthy et al. | 365/49 |
| 5,937,102 A | * | 8/1999 | Jin | 382/276 |
| 6,076,004 A | * | 6/2000 | Kanayama et al. | 600/410 |
| 6,111,992 A | * | 8/2000 | Likhterov et al. | 382/260 |
| 6,148,056 A | * | 11/2000 | Lin et al. | 378/4 |
| 6,341,179 B1 | * | 1/2002 | Stoyle et al. | 382/254 |
| 6,373,970 B1 | * | 4/2002 | Dong et al. | 382/128 |

OTHER PUBLICATIONS

Kim, S.P.;"Recursive High–Resolution Reconstruction of Blurred Multiframe Images", Image processing, IEEE, vol. 2 Issue 12, Dec. 1999, pp.: 1838–1842.*

Zhishun She; "Study of range–Doppler imaging using real data in microwave anecho chamber", IEEE, International Conference Jun. 1991, pp.: 460–463 vol. 1.*

* cited by examiner

*Primary Examiner*—Amelia M. Au
*Assistant Examiner*—Brian Q Le
(74) *Attorney, Agent, or Firm*—Katten Muchin Zavis Rosenman

(57) ABSTRACT

A method and apparatus for obtaining high-resolution images of rotating targets by using an image reconstruction algorithm without interpolation, are provided. The method comprises the steps of: a) acquiring initial information; b) calculating parameters; c) computing a start frequency $f_{s_k}$ and a step frequency $\delta f_k$; d) measuring data for the target to store them; e) determining whether or not the step d) is completed; f) if the determination result is negative, repeating the steps a) to e); and, if otherwise, obtaining the image; and g) displaying the image. The apparatus comprises means for rotating the controllable target by a predetermined angle; means for generating a first signal; means for transferring the first signal to the controllable target; means for receiving a second signal reflected from the controllable target; means for converting the first and the second signal into a third and forth signal, respectively; and means for processing the third and forth signal to reconstruct an image representing the controllable target, and for controlling the rotating means.

10 Claims, 11 Drawing Sheets

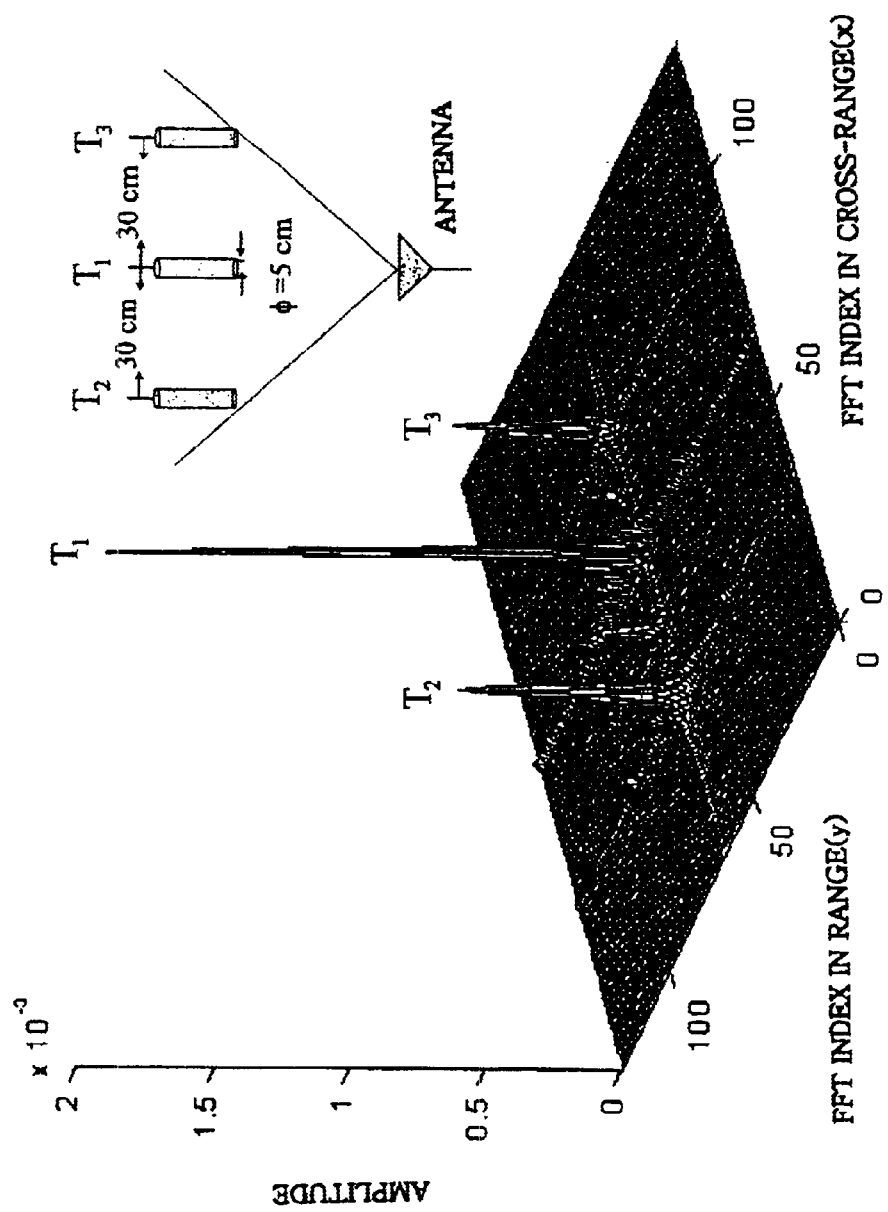
FIG. 6A *(PRIOR ART)*

METHOD AND APPARATUS FOR OBTAINING A HIGH RESOLUTION IMAGE

FIELD OF THE INVENTION

The present invention relates to a method and apparatus for obtaining an image; and more particularly, to a method and apparatus for obtaining a high-resolution image of a controllable rotating target by using an image reconstruction algorithm without interpolation.

DESCRIPTION OF THE PRIOR ART

Conventional imaging techniques including ISAR (Inverse Synthetic Aperture Radar), CT (Computerized Tomography) and MRI (Magnetic Resonance Imaging), for a controllable rotating target, have been used in various application areas, e.g., modeling and analysis of targets. Also, they have been adopted as a diagnostic method to support the medical and physical sciences and used to develop the target detection, recognition and classification techniques.

Referring to FIG. 1, there is shown a conventional imaging apparatus for obtaining a high resolution image of a rotating target, wherein the targets are linearly rotated. As shown in FIG. 1, the conventional imaging apparatus 100 generally samples a reflected signal from a target 180 on the polar coordinates of frequency and observation angle. The conventional imaging apparatus 100 comprises a rotating stage 110, a driving unit 120, a transmitting antenna 130, a receiving antenna 140, a reference signal generation unit 150, a controlling & signal processing unit 160 and a display unit 170.

The target 180 is mounted on the rotating stage 110. The driving unit 120 includes, e.g., a motor for rotating the rotating stage 110 and is physically connected to the rotating stage 110. Also, the driving unit 120 is electrically connected to the controlling & signal processing unit 160. The transmitting antenna 130 is electrically coupled to the controlling & signal processing unit 160 via the reference signal generation unit 150. The transmitting antenna 130 transmits to the target 180 a reference signal from the reference signal generation unit 150, whereas the receiving antenna 140 receives a reflected signal from the target 180 to transfer it to the controlling & signal processing unit 160. The controlling & signal processing unit 160 processes the reflected signal transferred from the receiving antenna 140 to provide a 2-dimensional image for the target 180. In this processing, the controlling & signal processing unit 160 applies the conventional 2-dimensional image reconstruction algorithm including interpolation to the reflected signal containing measured data for the target 180, thereby providing a 2-dimensional image.

For a small observation angle, a high-resolution image can be achieved in a short processing time by using an unfocused reconstruction algorithm because the received data can be modeled by samples of the Fourier transform on rectangular coordinates. But, if the observation angle range is not very small, the unfocused image is degraded by the blur effect. The blur effect can be removed by the reformatting of received data on rectangular lattice by using the interpolation in the focused image. However, the additional interpolation process leads to a longer processing time than the unfocused algorithm and the image degradation due to artifacts.

SUMMARY OF THE INVENTION

It is, therefore, an object of the present invention to provide a method and apparatus for obtaining a high-resolution image of a controllable rotating target by using an image reconstruction algorithm without interpolation.

In accordance with one aspect of the present invention, there is provided an imaging method capable of obtaining 2-dimensional high-resolution image of a controllable rotating target during a short image processing time without degrading the quality of the image, wherein the imaging method is employed in an imaging apparatus comprising means for controlling the imaging apparatus and processing a signal reflected from the target, means for generating a reference signal, means for transmitting and receiving the reference signal and means for rotating the target, the method comprising the steps of: a) acquiring initial information concerning the imaging apparatus and the target; b) calculating parameters for use in rotating the target, the parameters including a rotational increment of the rotating means and a total rotation angle thereof; c) computing a start frequency $f_{s_k}$ and a step frequency $\delta f_k$; d) measuring data for the target to store them based on the values obtained in the steps a) to c); e) determining whether or not the step d) is completed; f) if the determination result is negative, repeating the steps a) to e); and, if otherwise, obtaining the 2-dimensional high-resolution image by using an image reconstruction algorithm; and g) displaying the 2-dimensional high-resolution image, wherein the image reconstruction algorithm applies a Fast Fourier transform (FFT) process to the measured data to reconstruct the 2-dimesional high-resolution image without interpolation.

In accordance with another aspect of the invention, there is provided an apparatus for obtaining a 2-dimensional high-resolution image by rotating a controllable target and measuring data for the controllable target at each of rotating angles, comprising: means for rotating the controllable target to a predetermined angle, wherein intervals between the predetermined angles are not identical to each other; means for generating a first signal; means for transferring the first signal to the controllable target; means for receiving a second signal reflected from the controllable target; means for converting the first and the second signal into a third and fourth signal, respectively, wherein the frequency of the third signal is different from that of the forth signal; and means for processing the third and forth signal to reconstruct an image representing the controllable target, and for controlling the rotating means, wherein the controlling and signal processing means applies a FFT (Fast Fourier Transform) algorithm to the measured data without interpolation.

BRIEF DESCRIPTION OF THE DRAWINGS

The above and other objects and features of the present invention will become apparent from the following description of the preferred embodiment given in conjunction with the accompanying drawings, in which:

FIGS. 6A and 6B shows an unfocused and a focused image, respectively, for a target according to the prior art;

DETAILED DESCRIPTION OF THE PREFERRED EMBODIMENTS

Figure 1:
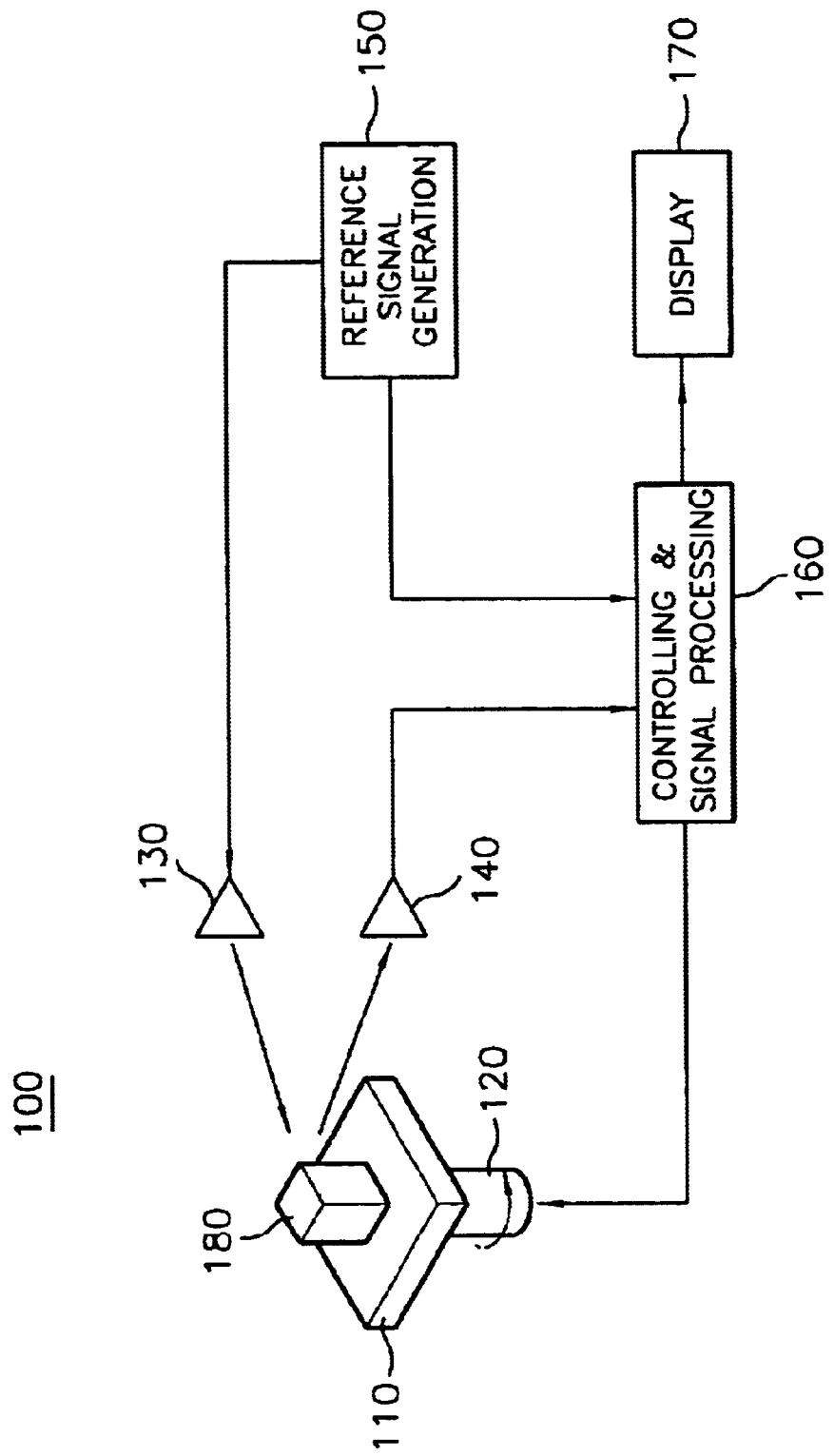
FIG. 1 represents a conventional imaging apparatus.
Figure 2:
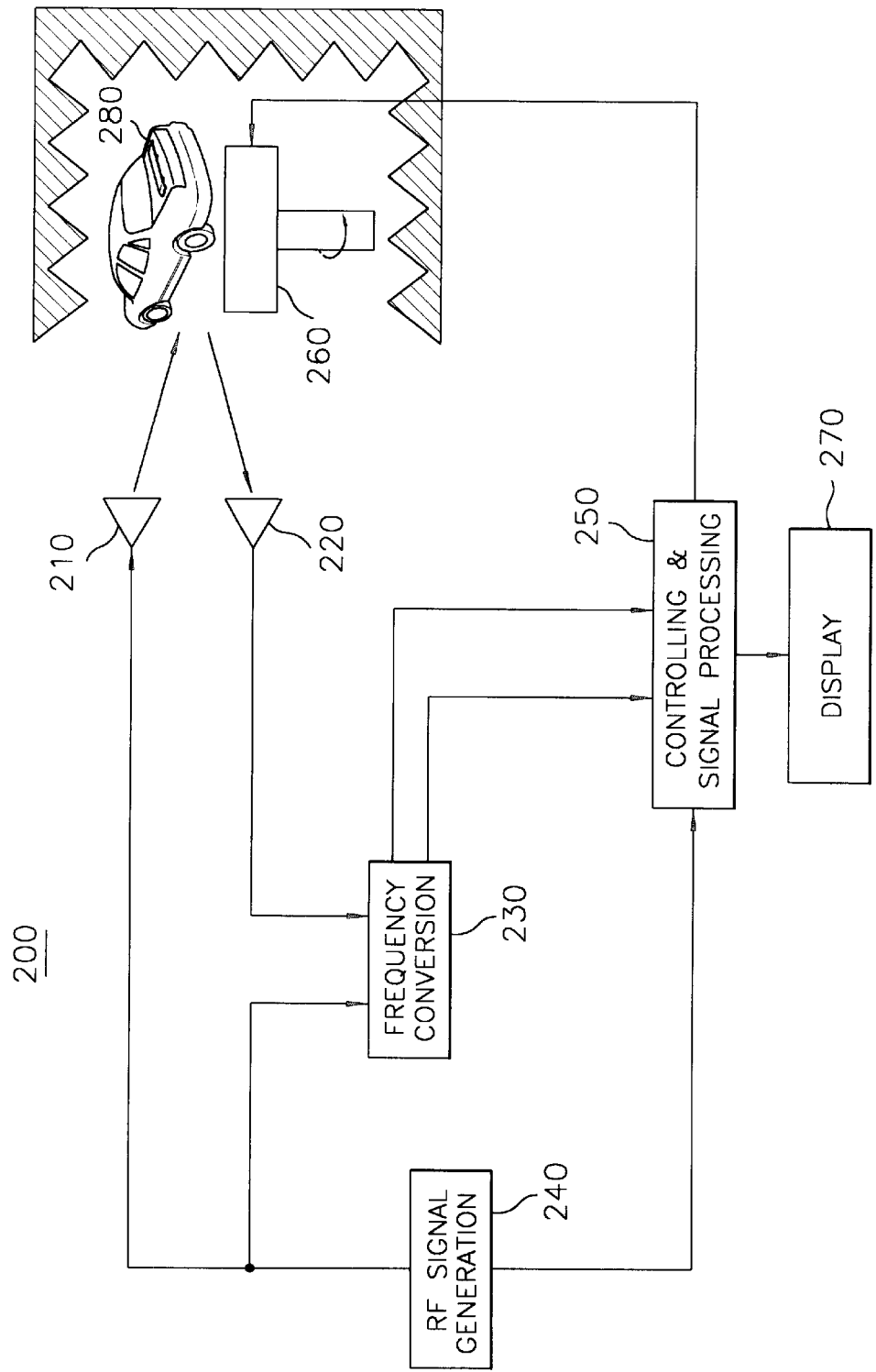
FIG. 2 exemplifies a schematic block diagram of an imaging apparatus capable of obtaining a 2-dimesional focused high-resolution image in accordance with the present invention.

Referring to FIG. 2, there is illustrated a radar imaging apparatus 200 in accordance with the present invention, wherein the radar imaging apparatus 200 is capable of obtaining a 2-dimensional focused high resolution image for a wide range of observation angle without a 2-dimensional interpolation process. As illustrated in FIG. 2, the radar imaging apparatus 200 comprises a transmitting antenna 210, a receiving antenna 220, a frequency conversion unit 230, an RF (Radio Frequency) signal generation unit 240, a controlling & signal processing unit 250, a target rotating unit 260 and a display unit 270. The RF signal generation unit 240 generates an RF signal to transfer it to the transmitting antenna 210 and a frequency conversion unit 230. The RF signal is a signal having a central frequency of, e.g., 27.5 GHz. The transmitting antenna 210 transmits the RF signal (with a frequency in which a start frequency and a stepped frequency are added) generated from the RF signal generation unit 240 to the target 280 mounted on the target rotating unit 260. It is noted that any objects can be used instead of the target 280.

The target rotating unit 260 rotates the target 280 under the control of the control & signal processing unit 250, wherein the target rotating unit 260 includes a spindle, a stage capable of mounting the target 280 and a motor electrically connected to the controlling & signal processing unit 250. The spindle and the stage are mechanically connected. The motor is a DC servo motor with an angular resolution of, e.g., 0.0036 degree and non-linearly rotates the target 280 mounted on the stage based on a rotation angle computed from the controlling & signal processing unit 250.

The frequency conversion unit 230 converts an RF signal measured by the receiving horn antenna 220 using the RF reference signal generated by the RF signal generation unit 240 into an IF signal to provide it to the controlling & signal processing unit 250. Thereafter, the controlling & signal processing unit 250 processes the IF signal provided from the frequency conversion unit 230 to reconstruct a 2-dimensional focused high resolution image through the display unit 270. In this processing, the controlling & signal processing unit 250 obtains the 2-dimensional focused high-resolution image by applying to measured data a 2-dimensional reconstruction algorithm without interpolation process.

Figure 3:
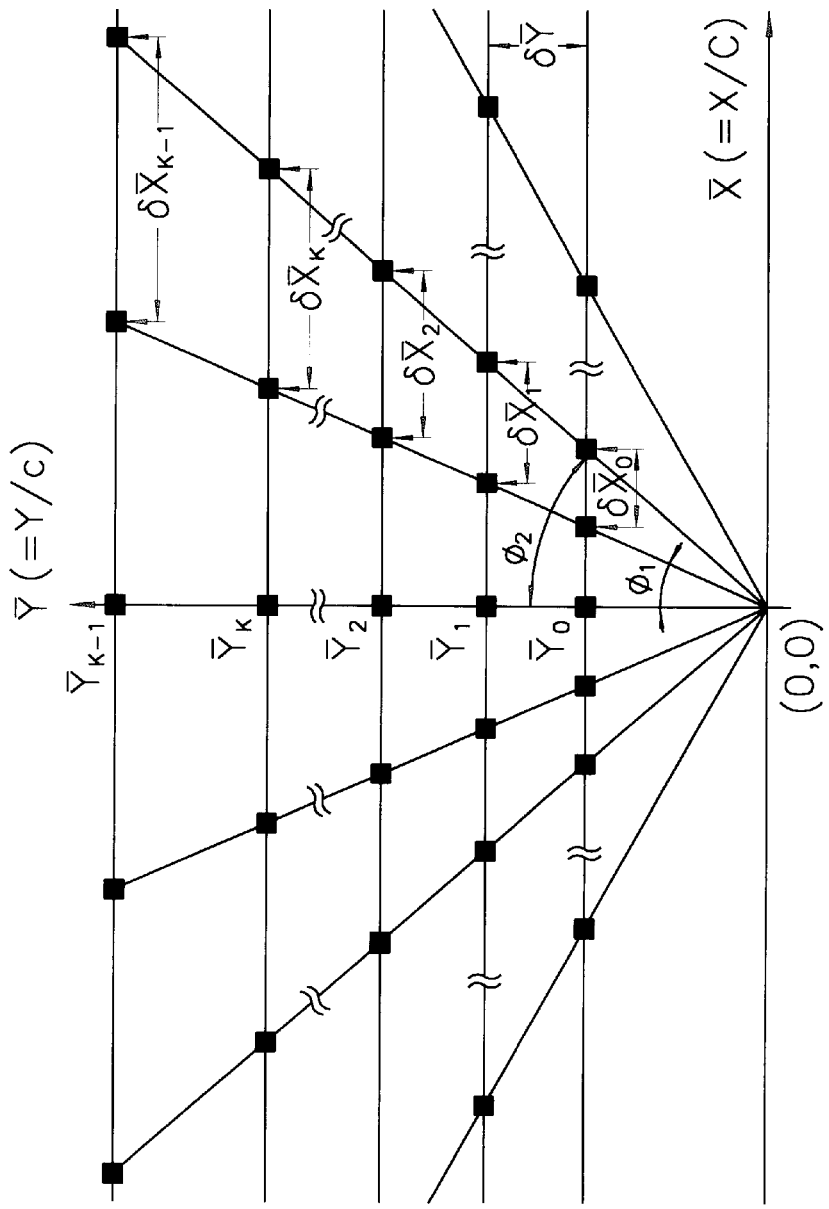
FIG. 3 presents a measurement coordinate for obtaining the measured data by sampling the reflected signal in accordance with the present invention.

Referring to FIG. 3, there is shown a measurement coordinate for obtaining the measured data by sampling the radar signal reflected from the target 280 in accordance with the present invention. The measurement method in accordance with the present invention is devised to measure the reflected radar signal from the target 280 directly on a rectangular raster by use of controlled frequency and rotation angle. As shown in FIG. 3, the reflected signal is sampled by using a uniform distribution with interval $\delta \overline{X}_k$ along $\overline{X}$ axis at any fixed point $\overline{Y}_k$, and also with interval $\delta \overline{Y}$ along the $\overline{Y}$ axis. The sampling positions are determined from an observation angle $\phi$ and the frequency f of radar waveform through Eq. 1, $$\overline{Y}=2f\cos\phi,\ \overline{X}=2f\sin\phi \quad \text{(Eq. 1)}$$

wherein $\overline{X}$ and $\overline{Y}$ are a horizontal and a vertical axes on the measurement coordinate plane, respectively, and $\overline{X}(=X/c)$, $\overline{Y}_k(=Y/c)$, $\delta\overline{X}_k(=\delta X_k/c)$ and $\delta\overline{Y}(=\delta Y/c)$ are normalized values of X, Y, $\delta X_k$ and $\delta Y$ by the light velocity c, respectively.

A start frequency $f_{s_k}$, a step frequency $\delta f_k$ and an interval of observation angle $\delta\phi_k$ should be controlled during the measurement of the reflected radar signal. To determine the start frequency and the step frequency at a given observation angle, an initial value, $\overline{Y}_0$, and the interval of measurement, $\delta\overline{Y}$, should be selected according to Eqs. 2 and 3, respectively.

$$\overline{Y}_0=2f_{s_0}\cos\phi,\ \text{at}\ \phi=0 \quad \text{(Eq. 2)}$$

$$\delta\overline{Y}=2\delta f_0\cos\phi,\ \text{at}\ \phi=0 \quad \text{(Eq. 3)}$$

wherein $f_s$ is the start frequency when the angle of rotation, $\phi$, is equal to zero and $\delta f_0$ is a step frequency at the angle $\phi=0$. The measurement interval $\delta\overline{Y}$ should be specified according to the relation between the step frequency and the range extent of the target 280.

Each angle of rotation is specified by the initial measurement interval, $\delta\overline{X}_0$, according to Eq. 4, which is determined by the design parameter of the maximum cross range extent.

$$\phi_k = \tan^{-1}\left(\frac{\delta\overline{X}_0 k}{\overline{Y}_0}\right)\ k=0,1,2,\ldots,K-1 \quad \text{(Eq. 4)}$$

A $k^{th}$ start frequency, $f_{s_k}$, at each observation angle is determined by following Eq.5:

$$f_{s_k} = \frac{c^2 \overline{Y}_0}{2\cos\phi_k}\ k=0,1,2,\ldots,K-1 \quad \text{(Eq. 5)}$$

(Eq. 5)
wherein c is the light velocity. Also, a $k^{th}$ step frequency, $\delta f_k$, should be selected to keep constant values for $\delta\overline{Y}$ and $\delta\overline{X}_k$, respectively, at each observation angle and can be calculated by using Eq. 6.

$$\delta f_k = \frac{c^2}{2}\sqrt{\Delta\overline{Y}^2 + (\overline{X}_{k+1}-\overline{X}_k)^2} \quad \text{(Eq. 6)}$$

$$= \frac{c^2}{2}\delta\overline{Y}\sqrt{1+\tan^2\phi_k}\ k=1,2,\ldots,K-1$$

(Eq. 6)
In the above consideration, the step frequency, $\delta f_k$, and an angle increment, $\delta\phi_k(=\phi_{k+1}-\phi_k)$, should be chosen to cover a maximum detection range and maximum cross range, respectively. Using the determined parameters, $\delta\overline{Y}$ and $\delta\overline{X}_k$ can be calculated by using Eqs. 7 and 8.

$$\tan\phi_0 = \frac{\delta\overline{X}_k}{\overline{Y}_0 + \delta\overline{Y}_k} \quad \text{(Eq. 7)}$$

$$\delta\overline{X}_k = \frac{\delta\overline{X}_0}{\overline{Y}_0}(\overline{Y}_0 + \delta\overline{Y}_k)\ k=1,2,\ldots,K-1 \quad \text{(Eq. 8)}$$

(Eq. 7)
(Eq. 8)
A uniformly distributed data set can be obtained by use of the selected measurement parameters $\overline{Y}_0$, $\delta\overline{Y}$, $\delta\overline{X}_k$, $\delta f$ and $f_{s_k}$, and one can directly apply an efficient FFT algorithm to the measurement data set for focused image reconstruction without interpolation.

Figure 4:
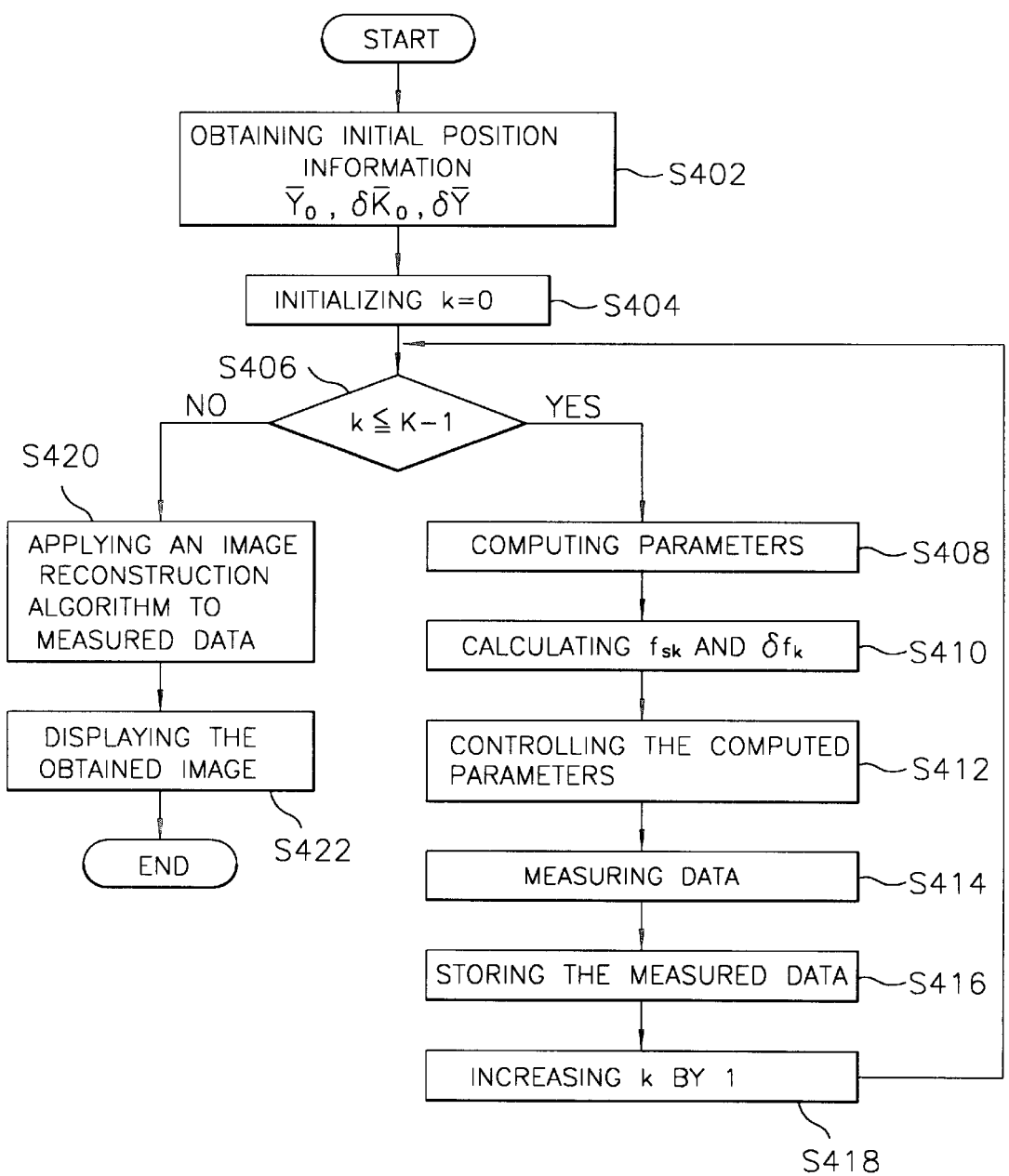
FIG. 4 illustrates a flow chart for explaining a method of obtaining a 2-dimensional high-resolution image in accordance with the present invention.

Referring to FIG. 4, there is shown a flow chart for explaining a method of obtaining a 2-dimensional focused high-resolution image in accordance with the present invention. In step S402, initial information, e.g., $\overline{Y}_0$, $\delta\overline{X}_0$ and $\delta Y$, of the target 280 and the imaging apparatus are obtained. In step S404, the data measurement starts after setting k value to zero. In step S406, the determination is made if k is less than K−1. If the determination result is positive, in step S408, parameters for use in controlling the rotation of the target 280, i.e., rotational increments of the DC motor and total rotating angle of the target rotating unit 260 are computed, and the procedure proceeds to step S410.

In step S410, $f_{s_k}$ and $\delta f_k$ are calculated. In step S412, the non-linear rotation of the target 280 and the measurement parameters, i.e., the step frequency and the start frequency, for use in obtaining an image, are controlled. In step S414, data is measured and the procedure proceeds to step S416. In step S416, the data measured in step S414 are stored in a predetermined memory (not shown). In step S418, k value is increased by 1 and the procedure proceeds to step S406.

If the determination result is negative, i.e., the data measurement process is completed, the procedure goes to step S420. In step S420, a 2-dimensional focused high-resolution image is obtained by applying the 2-dimensional reconstruction algorithm without interpolation process to the measured data. The 2-dimensional focused high-resolution image is displayed on the display unit 270 and the procedure is terminated, in step S422.

Simulation

The effect of the method of obtaining a 2-dimentional focused high-resolution image in accordance with present invention is analyzed through a simulation with parameters given by Table 1.

TABLE 1

PARAMETER EOR IMAGE RECONSTRUCTION

Imaging Parameters

| | |
|---|---|
| Center frequency | $f_c$ = 27.5 GHZ |
| Bandwidth | BW = 2 GHz |
| Stepped frequency | $\delta f$ = 0.0157 GHz |
| Range resolution | 0.075 m |
| Total observation angle | 27.432° |
| Interval of observation angle | $\delta\phi$ = 0.216° |
| Cross range resolution | 0.014 m |

The target geometry for the simulation of image reconstruction is given in Table 2 and all of targets for the image reconstruction simulation are considered as point targets.

TABLE 2

TARGET GEOMETRY FOR SIMULATION

| Point target | $P_1$ | $P_2$ | $P_3$ | $P_4$ | $P_5$ |
|---|---|---|---|---|---|
| Cross range (x) | 0 m | 0 m | −0.56 m | 0.28 m | 0.56 m |
| Range (y) | 0 m | 3 m | 0 m | −1.5 m | −3 m |

Figure 5A:
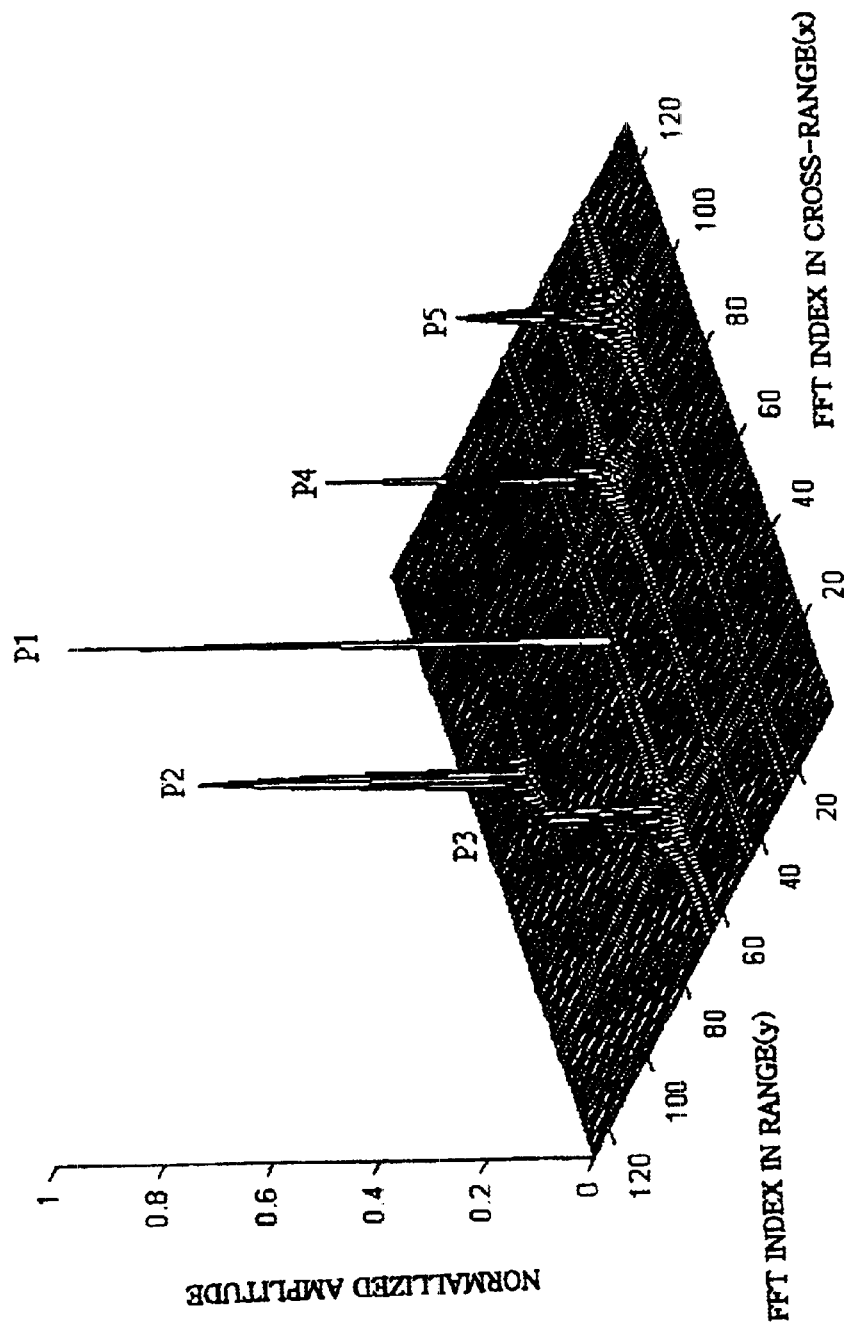
FIGS. 5A and 5B respectively depict a simulation result of an unfocused and a focused image according to the prior art.
Figure 5B:
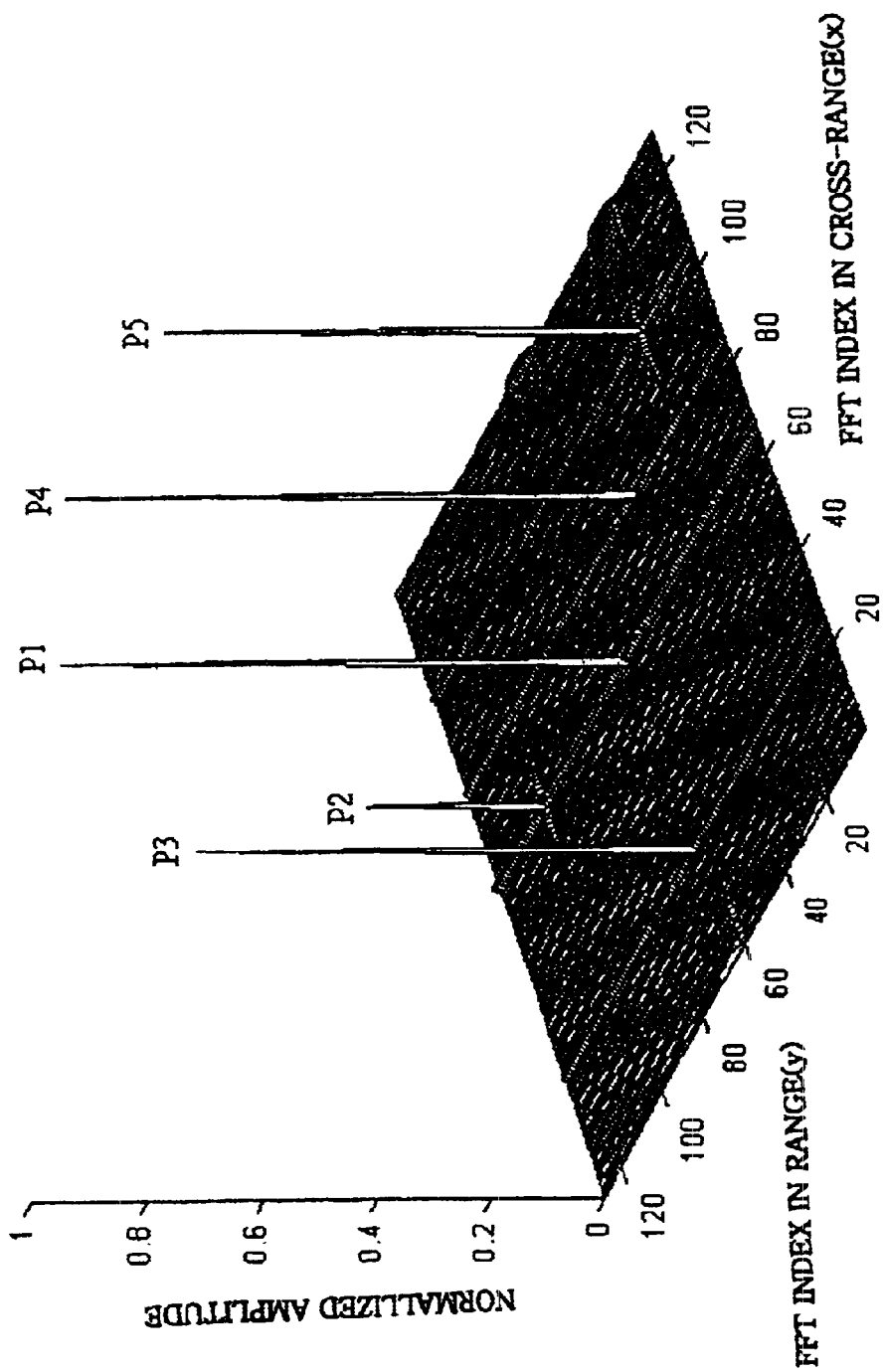

Referring to FIGS. 5A and 5B, there are shown the unfocused and the focused images, respectively, which are obtained by using the conventional sampling method. As shown in FIG. 5A, a decrease of a normalized amplitude and broadening of a point target response due to a blur effect are observed. When the point target is located far from a center of an image plane, the extent of blurring is increased. This can be explained by the fact that a phase correction error in the measured data is zero near the center of the image plane and the error is increased proportionally to radial distance.

For a small target, however, the unfocused reconstruction algorithm can be used efficiently with a short processing time.

The broadening effect for the case of the focused image in FIG. 5B is reduced, but the degradation of normalized amplitude is caused by the imperfection of interpolation process.

Figure 5C:
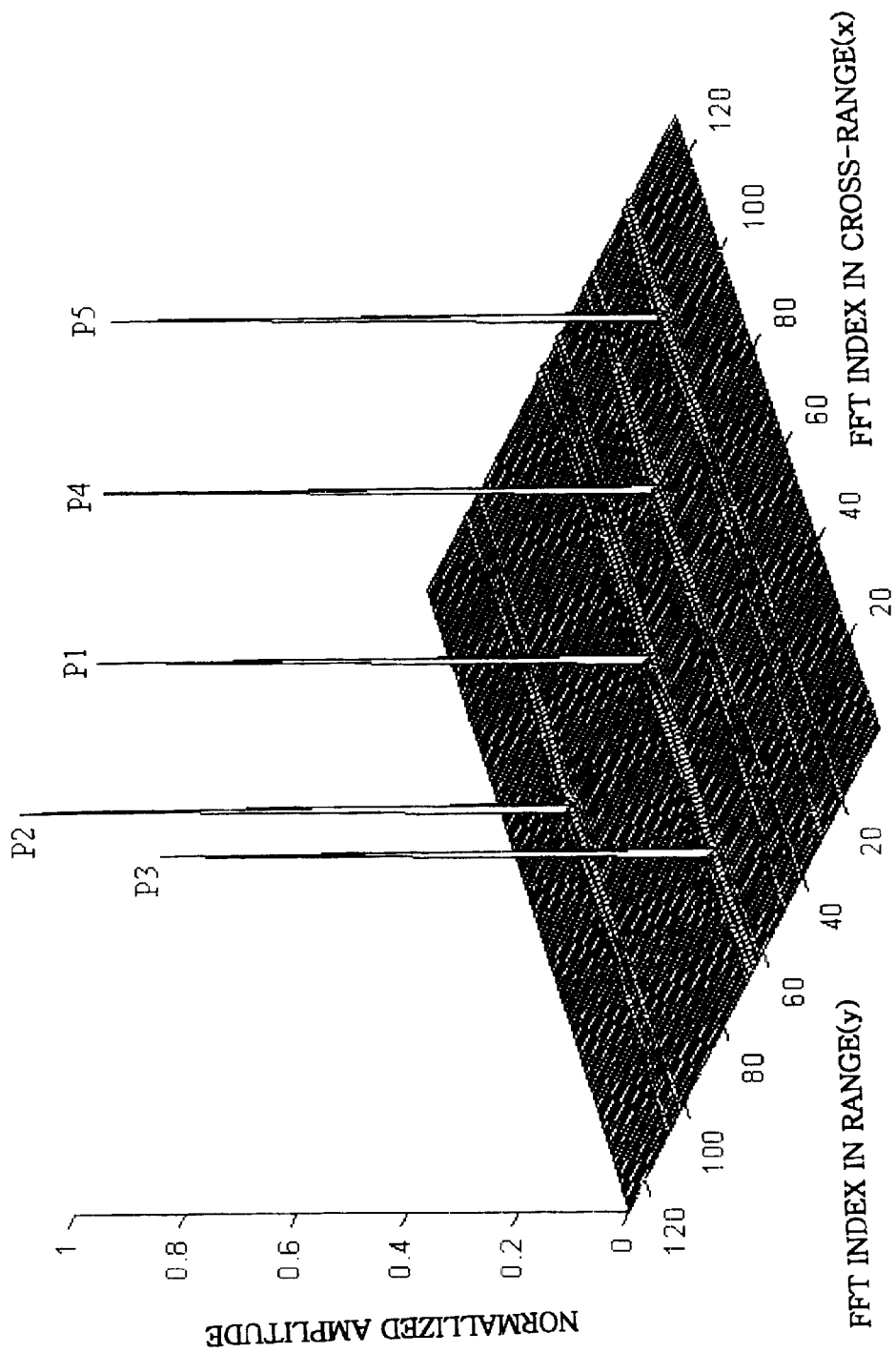
FIG. 5C is a simulation result of a focused image obtained in accordance with the present invention.

Referring to FIG. 5C, there is shown a focused image obtained by the present invention. The degradation of amplitude and broadening of the point target response are removed almost completely.

Table 3 shows the processing time for the image reconstruction of focused image according to the image size. For the image size of 128×128 pixels and 1024×1024 pixels, the image reconstruction times are 94 ms and 7062 ms, respectively. Because the computation time for the FFT is dramatically increased for a large image size, the improvement in the computation time may be deteriorated in proportion to the number of image pixels. However, the processing time is improved better than 33% for all cases compared with the prior art.

TABLE 3

THE PROCESSING TIME ACCORDING TO THE IMAGE SIZE

| Image Size | Present Invention | Prior Art | Time Improvement |
|---|---|---|---|
| 128 × 128 | 94 | 156 | 39.7% |
| 256 × 256 | 391 | 657 | 40.5% |
| 512 × 512 | 1703 | 2656 | 35.9% |
| 1024 × 1024 | 7062 | 10625 | 33.5% |

Experiment

Parameters given by Table 1 were used for the experiment to produce the radar image of rotating targets. As the imaging targets, three metal cylinders with a 5 cm diameter and 20 cm length were used. The three metal cylinders were separated from each other by 30 cm. As described above, the three metal cylinders were used as the targets but it was noted that any objects could be used instead thereof.

Figure 6B:
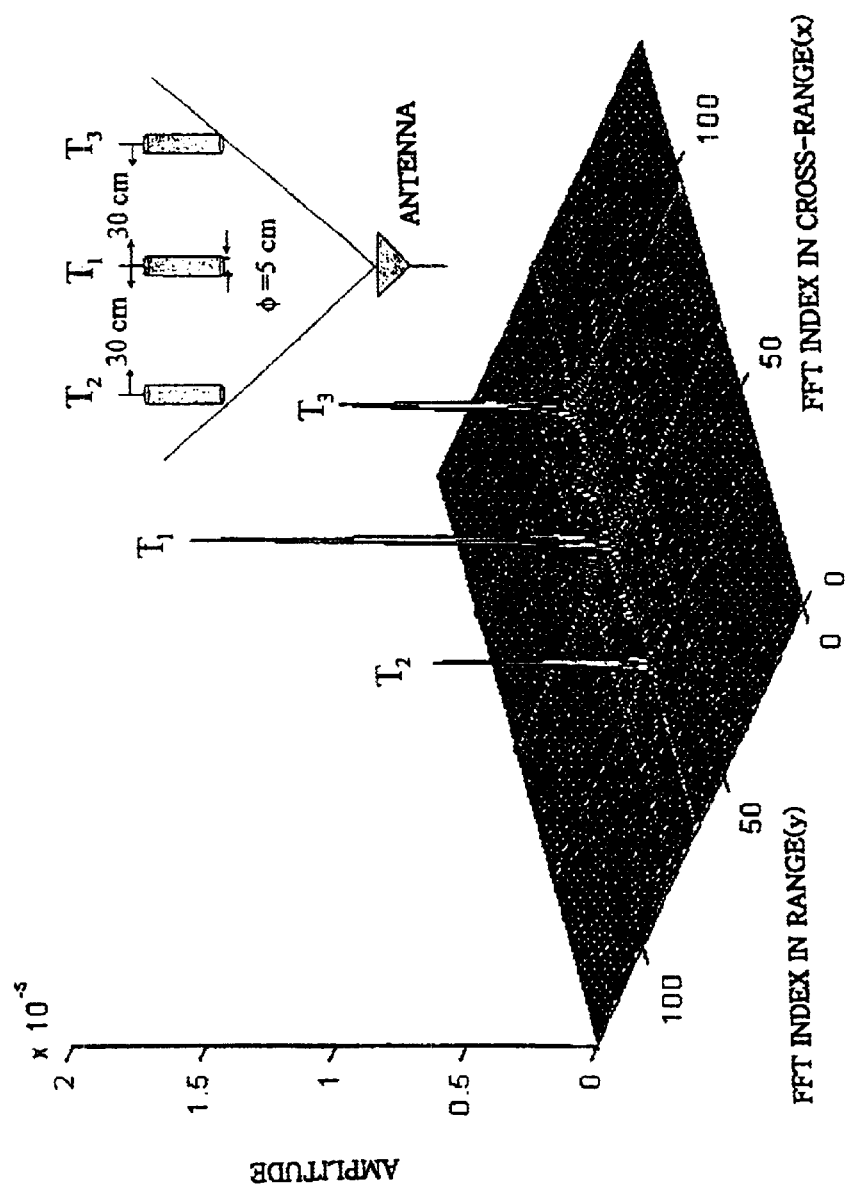

Referring to FIGS. 6A and 6B, there are a unfocused and a focused image, respectively, which were obtained by using the conventional sampling method. For the case of the unfocused image showed in FIG. 6A, the blur effect resulted in a decrease of amplitude and a broadening of the target response. The deterioration of image quality due to blurring was reduced in the focused image of FIG. 6B.

Figure 6C:
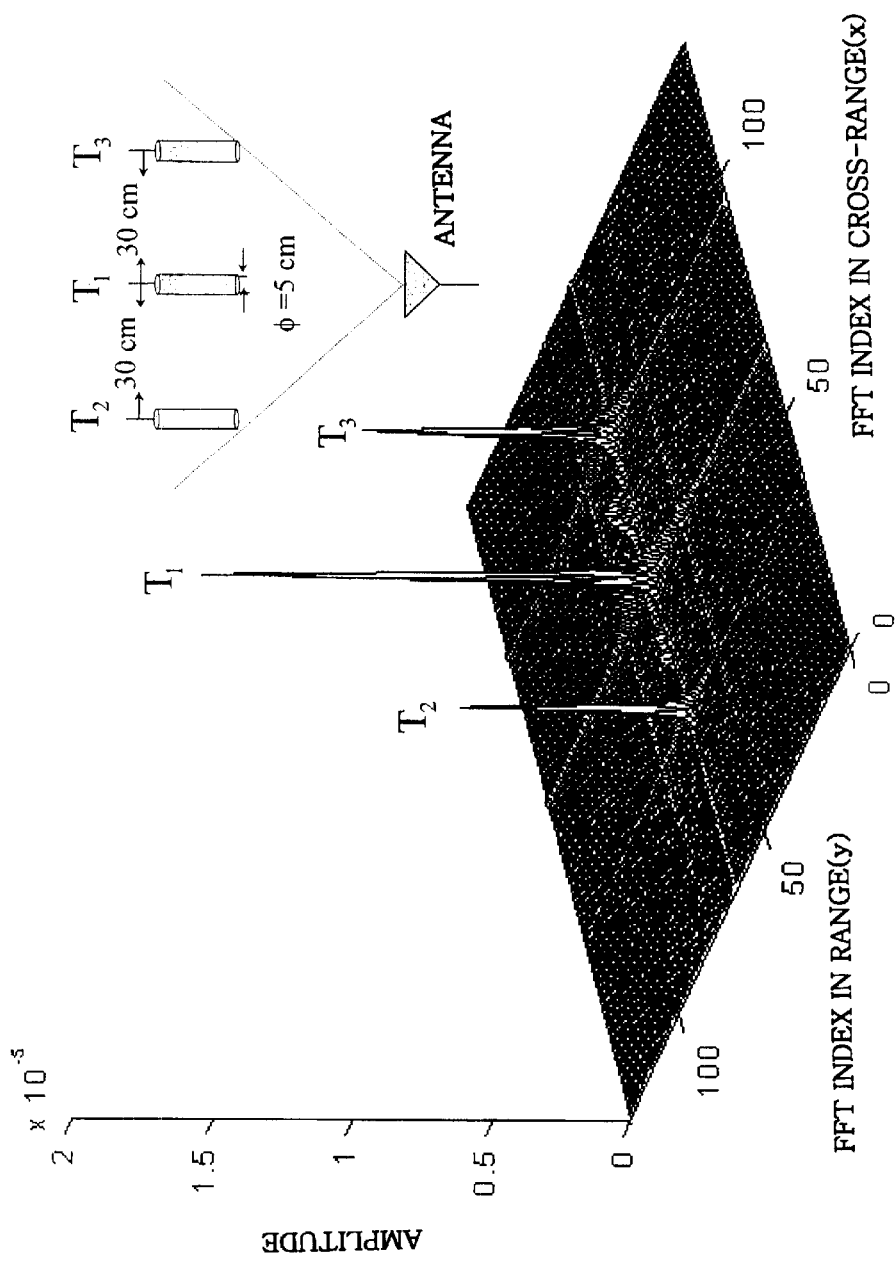
FIG. 6C presents a focused image for a target in accordance with the present invention.

A focused image reconstructed by the present invention is given by FIG. 6C. In spite of the control error of the observation angle, the degradation of amplitude was also diminished in comparison with FIGS. 6A and 6B. The angle error did not affect directly on the reconstructed image, but the image quality was degraded by the phase error caused by angle error through Fourier transform. The degree of phase error depended on not the maximum error of angle, but the average value. The amplitude of target $T_2$ and $T_3$ are reduced in FIGS. 5A to 5C because the phase correction error during the image reconstruction process was small near center of axis, but it became very large as moving far from the center of image plane. In all of three images, the ghost targets appeared between the real targets $T_1$, $T_2$ and $T_3$. These ghost targets were caused by the mutual scattering effect between closely located targets. The image quality could be deteriorated by the mutual scattering strongly.

Figure 7:
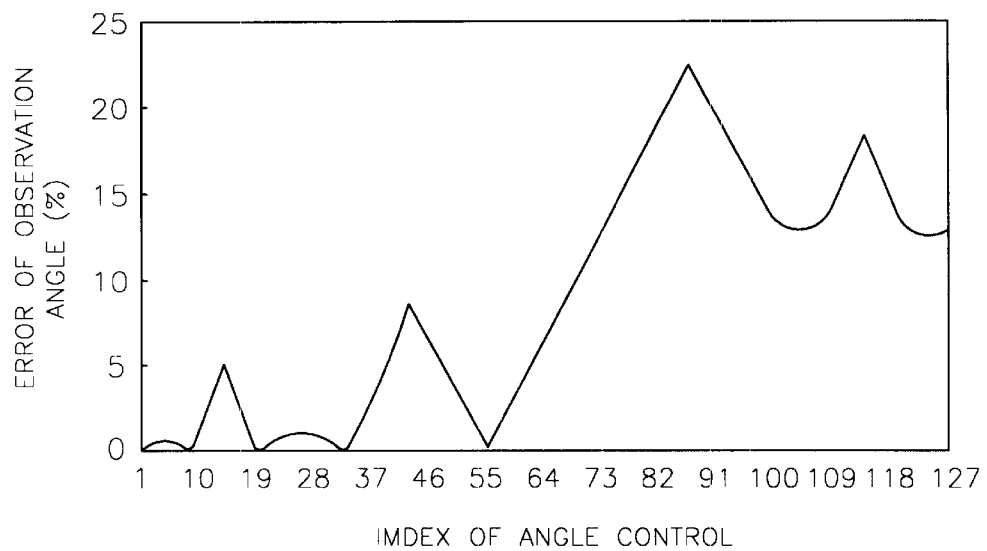
FIG. 7 illustrates the computed error between the designed rotation angle and controlled angle by the motor.

Referring to FIG. 7, there is illustrated the computed error between the designed rotation angle and controlled angle by the motor. The discrepancy of maximum error was 22.2% and the discrepancy of average error over total observation angle of 27.432 degree was 8.4%. The position error of the motor used for the experiment was ±0.0036 degree, which was not taken into consideration in FIG. 7 because it was very small compared with the average value of error. If the feedback control method was used for the motor control, the error of the observation angle control due to the encoder could be reduced.

As described above, the results can be concluded that the focused image algorithm with the present invention is superior to the unfocused and focused algorithm using interpolation in terms of the image quality and the processing time. In accordance with the present invention, the high quality image achieved by the simulation can be actually obtained with short processing time through the precise angular position control of the motor by feedback control method.

While the present invention has been described with respect to certain preferred embodiments only, other modifications and variations may be made without departing from the spirit and scope of the present invention as set forth in the following claims.

What is claimed is:

1. An imaging method capable of obtaining 2-dimensional high-resolution image for a controllable rotating target during a short image processing time without degrading the quality of the image, wherein the imaging method is employed in an imaging apparatus comprising means for controlling the imaging apparatus and processing a signal reflected from the target, means for generating a reference signal, means for transmitting and receiving the reference signal and means for rotating the target, comprising the steps of:

a) acquiring initial information concerning the imaging apparatus and the target;
   b) calculating parameters for use in rotating the target, the parameters including a rotational increment of the rotating means and a total rotation angle thereof;
   c) computing a start frequency $f_{s_k}$ and a step frequency $\delta f_k$;
   d) measuring data for the target to store them based on the values obtained in the steps a) to c);
   e) determining whether or not the step d) is completed;
   f) if the determination result is negative, repeating the steps a) to e); and, if otherwise, obtaining the 2-dimensional high-resolution image by using an image reconstruction algorithm; and
   g) displaying the 2-dimensional high-resolution image, wherein the image reconstruction algorithm applies a Fast Fourier transform (FFT) process to the measured data to reconstruct the 2-dimesional high-resolution image without interpolation.

2. The method according to claim 1, wherein the initial information includes an initial value $\overline{Y}_0$ on $\overline{Y}$ axis, an initial measurement interval $\delta \overline{X}_0$ on $\overline{X}$ axis and a measurement interval $\delta \overline{Y}$ on $\overline{Y}$ axis, wherein the initial information $\overline{Y}_0$, $\delta \overline{X}_0$ and $\delta \overline{Y}$ are calculated as follows:

$\overline{Y}_0 = 2f_{s_0}\cos\phi$, at $\phi=0$, $\delta \overline{Y}_2 = 2\delta f_0 \cos\delta$, at $\phi=0$, and $$\delta \overline{X}_k = \frac{\delta \overline{X}_0}{\overline{Y}_0}(\overline{Y}_0 + \delta \overline{Y}_k)\ k = 1, 2, \ldots, K-1.$$

3. The method according to claim 2, wherein $\phi_k$ of the step c) is calculated as follows:

$$\phi_k = \tan^{-1}\left(\frac{\delta \overline{X}_0 k}{\overline{Y}_0}\right)$$

k=0,1,2, ..., K−1,
wherein $f_{s_k}$ is computed as follows:

$$f_{s_k} = \frac{c^2 \overline{Y}_0}{2\cos\phi_k}$$

k=0,1,2, ..., K−1,
wherein $\delta f_k$ is calculated as follows:

$$\delta f_k = \frac{c^2}{2}\sqrt{\Delta \overline{Y}^2 + (\overline{X}_{k+1} - \overline{X}_k)^2}$$
$$= \frac{c^2}{2}\delta \overline{Y}\sqrt{1 + \tan^2 \delta_k}$$

k=1,2, ..., K−1,
wherein c is a light velocity.

4. The method according to claim 3, wherein a central frequency of the reference signal ranges from tens to hundreds of GHz and a bandwidth thereof is several GHz; and the total measurement angle ranges from tens to hundreds of degree.

5. An apparatus for obtaining a 2-dimensional high-resolution image by rotating a controllable target and measuring data for the controllable target at each of rotating angles, comprising:

means for rotating the controllable target to a predetermined angle, wherein intervals between the predetermined angles are not identical to each other;
   means for generating a first signal;
   means for transferring the first signal to the controllable target;
   means for receiving a second signal reflected from the controllable target;
   means for converting the first and the second signal into a third and forth signal, respectively, wherein the frequency of the third signal is different from that of the forth signal; and
   means for processing the third and forth signal to reconstruct an image representing the controllable target, and for controlling the rotating means,
   wherein the controlling and signal processing means applies an FFT (Fast Fourier Transform) algorithm to the measured data without interpolation.

6. The apparatus according to claim 5, wherein the controlling and signal processing means generates a control signal for controlling the rotation of the controllable target.

7. The apparatus according to claim 6, wherein the rotating means includes a DC motor rotating the controllable target in response to the control signal generated from the controlling and signal processing means.

8. The apparatus according to claim 7, wherein the rotating means has an angular resolution of less than $10^{-3}$ order of degree.

9. The apparatus according to claim 8, wherein the rotating means rotates the controllable target in response to the control signal having a less than $10^{-2}$ order of frequency of giga hertz (GHz).

10. The apparatus according to claim 9, wherein the first and second signal are different from each other in their frequency and are identical to each other in their phase.

* * * * *